UNITED STATES PATENT OFFICE.

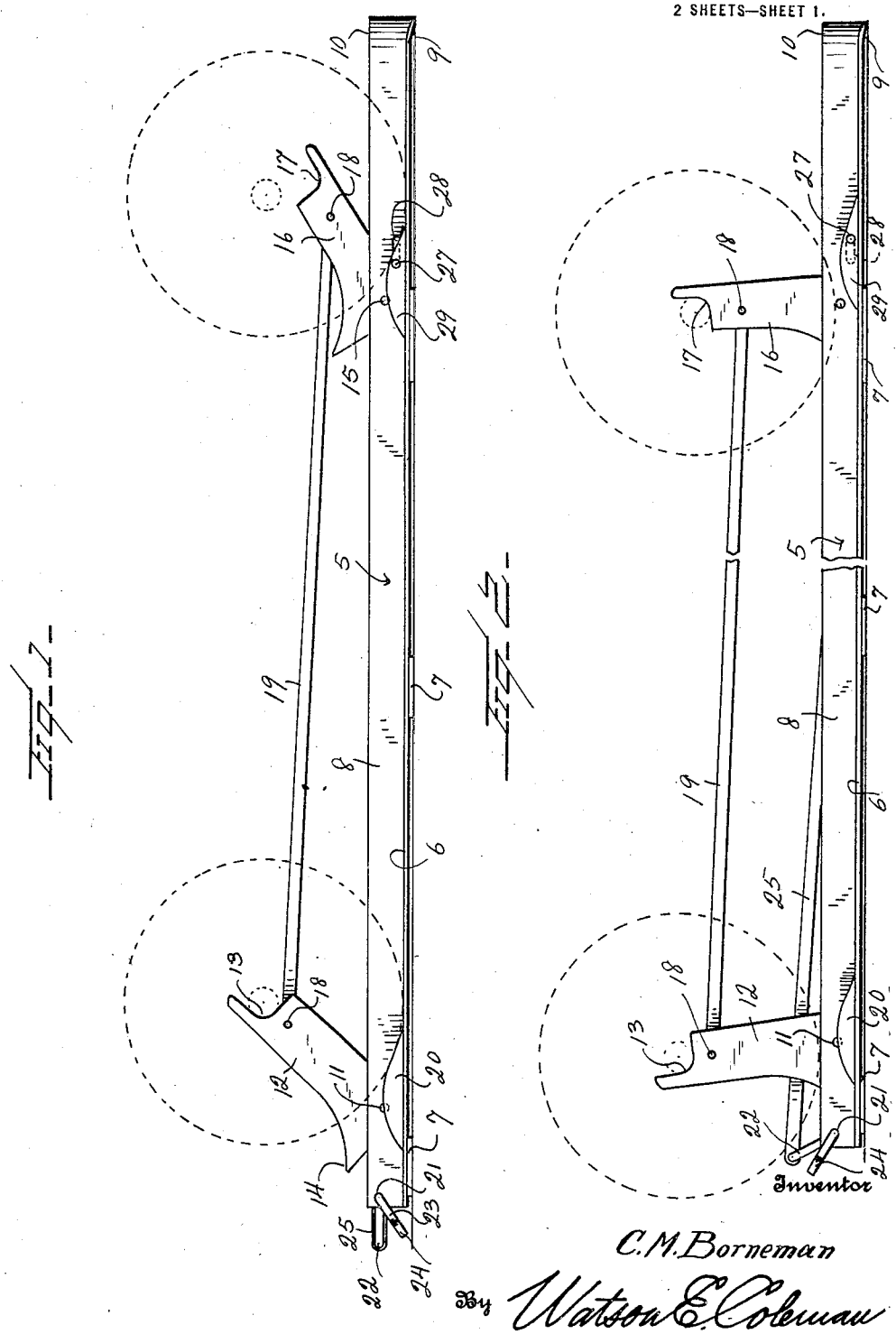

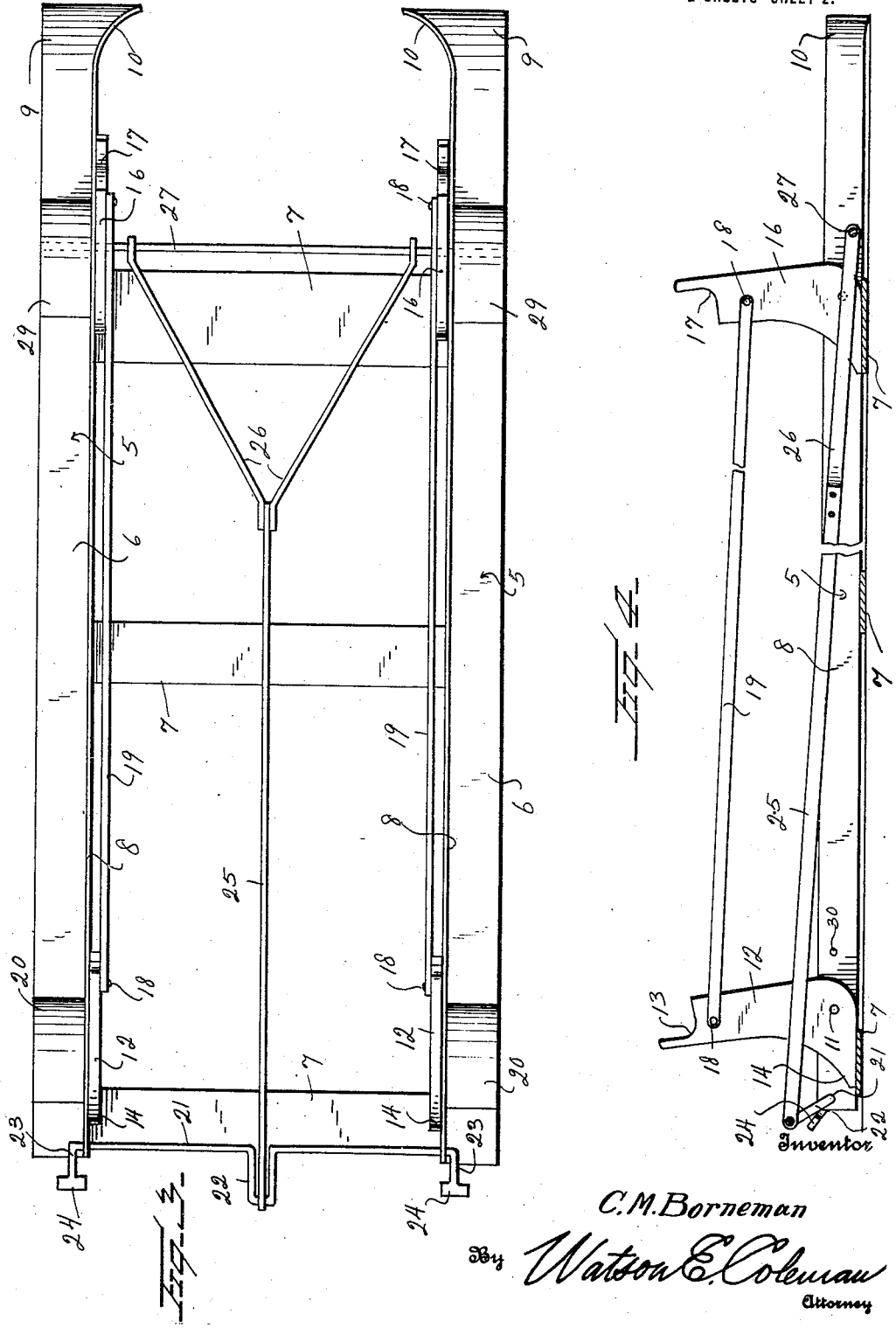

CHARLES M. BORNEMAN, OF ALLENTOWN, PENNSYLVANIA.

AUTO-JACK.

1,332,596.      Specification of Letters Patent.      Patented Mar. 2, 1920.

Application filed August 27, 1919. Serial No. 320,184.

*To all whom it may concern:*

Be it known that I, CHARLES M. BORNEMAN, a citizen of the United States, residing at Allentown, in the county of Lehigh and State of Pennsylvania, have invented certain new and useful Improvements in Auto-Jacks, of which the following is a specification, reference being had to the accompanying drawings.

This invention relates to jacks, and particularly to that type used for elevating motor driven vehicles from the ground and has for its object to provide a device of this character that can be readily installed in any garage.

Another object of this invention is to provide a device of this character, the jacking mechanism of which is operated by the power of the vehicle in its raising and lowering function.

A still further object of the invention is to provide a novel arrangement of elevating blocks which coöperate with the power of the vehicle to operate the jacking mechanism, one set of said elevating blocks being adjustable to facilitate the raising and lowering operation.

These objects are attained by the mechanism illustrated in the accompanying drawings, in which:—

Figure 1 is a side elevation of the jack with the stationary and adjustable elevating blocks in position to assist the vehicle to operate the jacking mechanism;

Fig. 2 is a side elevation showing the position of the adjustable elevating blocks and jack mechanism when the automobile is supported on the jack;

Fig. 3 is a top plan view showing the adjusting mechanism of the adjustable elevating blocks; and Fig. 4 is a longitudinal sectional view.

Referring to the drawings, 5 indicates a base member comprising spaced tracks 6 which are connected by means of braces 7. The track members 6 include at their inner edges flanges 8 which serve as guides for the wheels of the vehicle. The rear portions 9 of the track 6 have their inner edges and the rear portions of the flanges 8 inwardly extended as at 10 to guide the wheels to the track members 6.

Pivoted as at 11 to the front portion of the flanges 8 is a rocking jack 12 having a shoulder 13 adapted to support the front axle of the vehicle. The lower free portion of the jack 12 is extended outwardly as at 14 to provide a substantial base for the jack. Pivoted to the rear portions of the flanges 8, as at 15, is a lifting jack 16 having a shoulder 17 adapted to receive the rear axle of a vehicle. The lower portion of said jack 16 is extended outwardly to provide a suitable base for supporting the weight of the vehicle. The jacks 12 and 16 are pivotally connected as at 18 by means of a rod 19, which causes the jacks to operate in unison.

Secured to the forward portions of the tracks 6 is a stationary elevating block 20, which is positioned adjacent the pivotal connection of the jack 12 and is intended to cause the front wheels of the vehicle to rise a short distance from the track.

Journaled in the forward portion of the flanges 8 is a crank shaft 21 having a crank 22 formed at its central portion. The ends of the shaft are extended outwardly in right angular relation to the main portion of the shaft, as at 23, and are formed with foot pedals 24. Connected to the crank 22 is a rod 25 which extends to the rear portion of the base member and includes branches 26. These branches are connected to a shaft 27, the ends of which extend through slots 28 formed in each of the flanges 8, at their rearward portions. Secured to each of the extending ends of the shaft is an adjustable elevating block 29, which is movably supported by the tracks 6. Stop pins 30 are carried by the front portions of the flanges 8, behind the front jack mechanism, and are intended to limit the downward movement of the jack mechanism, and hold the same in proper position.

In operation, when the vehicle enters the track members, the jacks 16 are so positioned that the front axle of the vehicle passes over them and the elevating blocks 29. The front jacks 12, however, are positioned in the path of the front axle, so that they engage the same. Previous to this operation, the shaft 21 has been rocked to move the adjustable elevating blocks 29 forwardly. By this arrangement of the elevating blocks, the front wheels of the vehicle engage the blocks at the same time, so that continued movement of the vehicle under its own power will cause the wheels to be elevated by the blocks, and permit the front axle of the vehicle to force the jacks 12 upwardly. At the same time, the rear jacks 16 engage the rear axle. Continued movement of the vehicle will entirely raise the wheels of the same and support the vehicle above the tracks.

When it is desired to leave the track, the rock shaft is operated so as to move the adjustable elevating blocks 29 toward the forward portion of the tracks 6 so as to prevent the highest point of said blocks from interfering with the movement of the rear wheels. When the motor of the vehicle is started, the rearward movement of the same through the coöperation of the elevating blocks will permit the vehicle to force the jacks downwardly and easily leave the track.

What is claimed is:—

1. A device of the class described comprising spaced wheel engaging base members, a flange on the inner confronting edges of each member, a pair of jack arms pivoted to each flange adjacent the ends thereof each arm being wider at its base than at its upper portion, the outer edges of each base including an extension whereby the jack arm is supported in its vertical position and means for operatively connecting the jack arms of each flange to each other.

2. A device of the class described comprising spaced wheel engaging base members, a flange on the inner confronting edges of each member, a pair of jack arms pivoted to each flange adjacent the ends thereof each arm being wider at its base than at its upper portion, the outer edges of each base including an extension whereby the jack arm is supported in its vertical position and a rod pivoted at one end to one of said jack arms adjacent the upper surface thereof, the other end of said rod being pivoted to the other arm of the pair below the upper surface of said arm.

3. A device of the character described comprising spaced wheel engaging base members, a vertically disposed flange on the inner marginal edge of each base member, a pair of jack arms pivoted to each flange adjacent the ends thereof, each arm having the upper portion of its inner edge reduced to provide an axle support, the lower inner base portion of one arm and outer base portion of the other arm of the pair including an extension tapering toward the upper portion of the arm whereby the arms are limited to movement in one direction, a means for operatively connecting the arms of each pair to each other.

4. A device of the character described comprising spaced wheel engaging base members, a vertically disposed flange on the inner marginal edge of each base member, a pair of jack arms pivoted to each flange adjacent the ends thereof, each arm having the upper portion of its inner edge reduced to provide an axle support, the lower inner base portion of one arm and outer base portion of the other arm of the pair including an extension tapering toward the upper portion of the arm whereby the arms are limited to movement in one direction, a pair of elevating blocks carried by each base member and manually operable means for connecting one elevating block of each pair to an adjacent elevating block of the opposite pair, said connected blocks being simultaneously adjustable independently of the jack arms.

In testimony whereof, I hereunto affix my signature.

CHARLES M. BORNEMAN.